United States Patent [19]

Pan et al.

[11] Patent Number: 4,865,955
[45] Date of Patent: Sep. 12, 1989

[54] RECORDING ELEMENTS COMPRISING WRITE-ONCE THIN FILM ALLOY LAYERS

[75] Inventors: Kee-Chuan Pan; Yuan-Sheng Tyan, both of Webster; Fridrich Vazan, Pittsford, all of N.Y.

[73] Assignee: Eastman Kodak Company, Rochester, N.Y.

[21] Appl. No.: 255,297

[22] Filed: Oct. 11, 1988

Related U.S. Application Data

[62] Division of Ser. No. 58,721, Jun. 5, 1987; Pat. No. 4,798,785.

[51] Int. Cl.$^4$ .............................................. G03C 1/72
[52] U.S. Cl. .................................... 430/346; 430/19; 430/945; 346/135.1
[58] Field of Search ................. 430/19, 495, 945, 346, 430/964; 346/135.1

[56] References Cited

U.S. PATENT DOCUMENTS

| | | | |
|---|---|---|---|
| 4,230,939 | 10/1980 | de Bont et al. | 235/488 |
| 4,405,706 | 9/1983 | Takahashi et al. | 430/271 |
| 4,686,543 | 8/1987 | Tani et al. | 346/137 |
| 4,712,207 | 12/1987 | Reno | 369/121 |

FOREIGN PATENT DOCUMENTS 0184452 5/1985 European Pat. Off. .

Primary Examiner—Paul R. Michl
Assistant Examiner—Lee C. Wright
Attorney, Agent, or Firm—John R. Everett

[57] ABSTRACT

Optical recording and record elements are provided. The elements comprise a write-once amorphous thin-film optical recording layer of an alloy having a composition within a polygon in a ternary composition diagram of antimony, aluminum, and tin; wherein
(a) the composition diagram is according to FIG. 7 herein; and
(b) the polygon has the following vertices and corresponding coordinates in atom percent:

| Vertices | Coordinates | | |
|---|---|---|---|
| | Sb | Sn | Al |
| A | 98 | 0 | 2 |
| B | 54 | 44 | 2 |
| C | 36 | 44 | 20 |
| D | 40 | 10 | 50 |
| E | 74 | 0 | 26 |

3 Claims, 5 Drawing Sheets

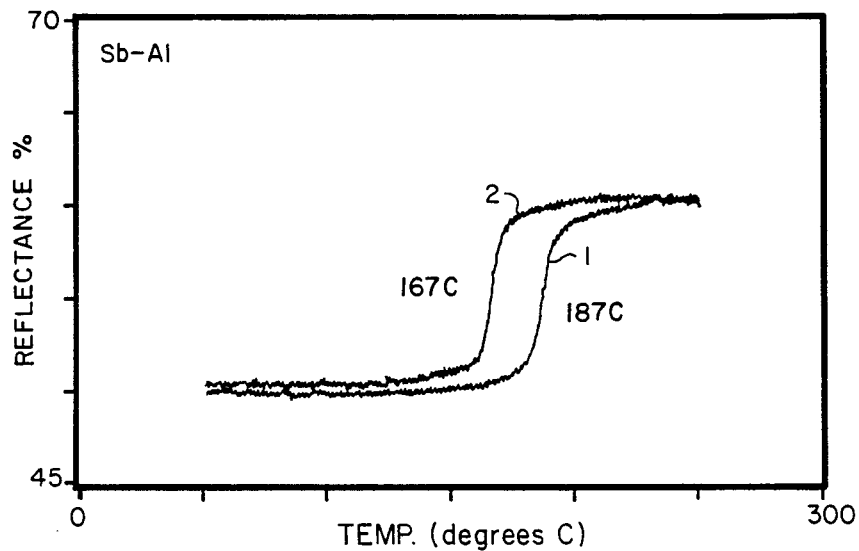
FIG. 3 REFLECTANCE OF THE HEAT-TREATED $Sb_{90}Al_{10}$ (CURVE 1) AND $Sb_{87}Al_{13}$ (CURVE 2)
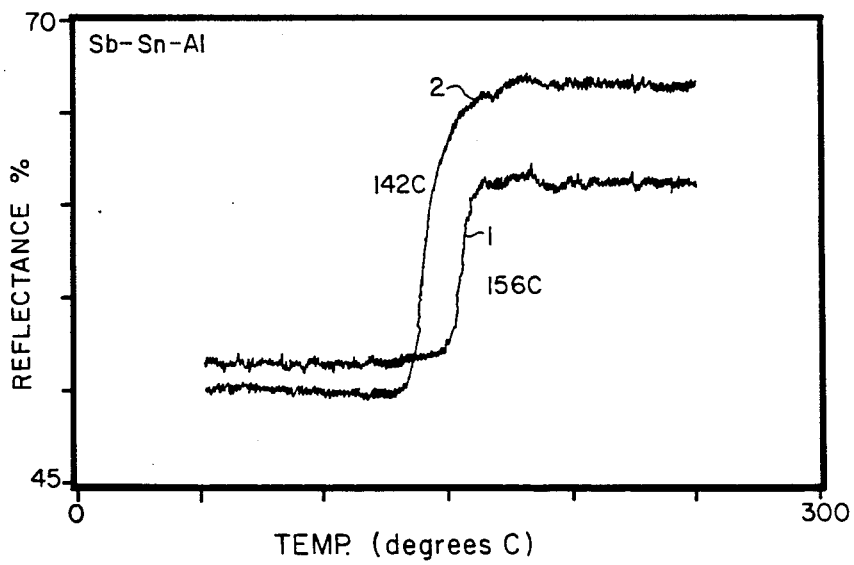
FIG. 5 REFLECTANCE OF THE HEAT-TREATED $Sb_{82}Sn_8Al_{10}$ (CURVE 1) AND $Sb_{65}Sn_{29}Al_6$ (CURVE 2)

RECORDING ELEMENTS COMPRISING WRITE-ONCE THIN FILM ALLOY LAYERS

This is a division of application Ser. No. 058,721, filed June 5, 1987, U.S. Pat. No 4,798,785.

FIELD OF THE INVENTION

This invention relates to recording elements and recording methods.

BACKGROUND OF THE INVENTION

Thin film optical recording layers using chalcogenide thin-films and amorphous to crystalline phase transitions have been the subject of many investigations since the early 1970's. The initial interests were focused on "erasable", and therefore reusable, optical recording layers since the amorphous to crystalline transition is, in principle, a reversible process. Such layers are generally prepared by a vacuum process. The layer is amorphous when so prepared. A low power, relatively long duration laser pulse is used to heat a local spot on the layer to below the melting point for a sufficient length of time to cause the spots to crystallize. These crystalline spots can in turn be heated, by a higher power, shorter duration laser, above the melting point of the crystallized spots to randomize the structure of the spots. The layer is designed such that upon the termination of the laser pulse the cooling rate of the heated spot is high enough that the randomized structure is frozen to achieve an amorphous state.

Thus by adjusting the laser power and duration, the state of a selected area on the layer can be switched between the amorphous state and the crystalline state to create a pattern of amorphous and crystalline sports which can be used for information storage. Since the phase transition is reversible, the pattern can be erased and replaced with a different recorded pattern. Theoretically, this erase-write cycle can be carried out any number of times.

A principal difficulty is that the rate of crystallization of most layers studied is usually too low. For practical applications, it is desirable to have layers which can be crystallized by laser pulses shorter than a microsecond ($\mu$s). Presently, few materials have demonstrated such capabilities. For some materials with high crystallization rates (e.g. Te-Sn alloy), the data retention times are often not adequate because of the instability of the amorphous state.

Because of the slow crystallization of most materials, the crystallization step is generally used as the erasure step in erasable optical recording layers. A laser spot elongated in the direction of the laser movement is used to give an effectively long duration laser exposure. Such long laser spots cannot be used for high density recording. The amorphizing step, on the other hand, is used as the recording step since this can be achieved with short laser pulse, and hence can be done at high speed.

Very few materials are known for optical recording layers in which the above described write-erase-write cycle is of practical use. No erasable phase-change type optical recording layers have been commercialized.

A good deal of attention has also focused on so-called "write-once" thin film optical recording layers. Write-once simply means that the layers can be recorded upon only once. Such layers cannot be erased and reused for a subsequent recording.

Since thin film optical recording layers are generally amorphous when prepared, it is desirable to use the crystallization step as the recording step in write-once layers. However, the problem of slow crystallization prevents the achievement of high data rates. High data rates are critical for write-once layers designed for use with computers.

European Patent Application No. 0184452 broadly discloses erasable optical recording layers of various metal alloys. Information recording and erasure are said to be achieved by switching the layers between two different crystalline states. The layers are generally prepared in the amorphous states which have to be first converted into one of the two crystalline states before information can be recorded. The crystallization step, achieved by either a bulk heat-treatment or a prolonged laser exposure, is said to have a lower reflectance than the amorphous state. The examples indicate that the materials disclosed therein have a very low rate of crystallization. This application further teaches that the optical recording layers disclosed therein are unsuitable for use in the amorphous-to-crystalline transition mechanism because of the instability of the amorphous state in general.

Another problem is that many of the chalcogen containing materials which undergo the amorphous-to-crystalline transition mechanism are usually corrosion prone.

The problem is that the prior art has not provided write-once optical recording layers which possess the combination of (a) a crystallization rate less than 1.0 $\mu$s, (b) good corrosion resistance, (c) a stable amorphous state and (d) a capability of high rate, high density recordings.

SUMMARY OF THE INVENTION

The present invention provides a recording element comprising a write-once amorphous thin-film optical recording layer of an alloy having a composition within a polygon in a ternary composition diagram of antimony, aluminum, and tin described in FIG. 7 herein; wherein the polygon has the following vertices and corresponding coordinates in atom percent:

| Vertices | Coordinates | | |
|---|---|---|---|
| | Sb | Sn | Al |
| A | 98 | 0 | 2 |
| B | 54 | 44 | 2 |
| C | 36 | 44 | 20 |
| D | 40 | 10 | 50 |
| E | 74 | 0 | 26 |

The pattern invention also provides a record element having
(a) a composition within the above described polygon in FIG. 7; and
(b) a pattern of amorphous and crystalline areas.

The elements of this invention do not suffer the environmental corrosion seen in chalcogen rich thin films. The rate of crystallization of the optical recording layers is less than 1 $\mu$s using practical laser power. The amorphous state is very stable. Thus, recordings on the thin film are made using the amorphous to crystalline transition mechanism. The layers are capable of high density, high rate recordings. Moreover the layers cannot be switched between two different crystalline states as suggested by European Patent Application No.

0184452 and the crystalline state is uniformly more reflective than the amorphous state.

It has been found that layers formed from alloy compositions outside of the defined polygon (a) are either crystalline as deposited or (b) crystallize too slowly to be of practical use. The layers have an amorphous to crystalline transition temperature of at least 80° C.

Layers used in the elements of the invention are capable of forming only a single crystalline state. That is the crystalline state is the same throughout the recorded layer. In many recordings the crystalline areas will have a uniform composition.

Especially useful record and recording elements have alloy compositions within a polygon in FIG. 7 having the following vertices and corresponding coordinates:

| Vertices | Coordinates | | |
|---|---|---|---|
| | Sb | Sn | Al |
| F | 90 | 4 | 6 |
| G | 54 | 40 | 6 |
| H | 40 | 34 | 26 |
| I | 78 | 4 | 18 |

BRIEF DESCRIPTION OF THE DRAWINGS

FIGS. 3, 4, 5 and 6 are curves showing some of the experimental results of the examples.

DETAILED DESCRIPTION OF THE INVENTION

Recording information on the thin film layers is achieved by focusing an information modulated laser beam on the layer thereby forming a pattern of crystalline and amorphous areas on the layer. All the crystalline areas will be in the same state.

Figure 1:
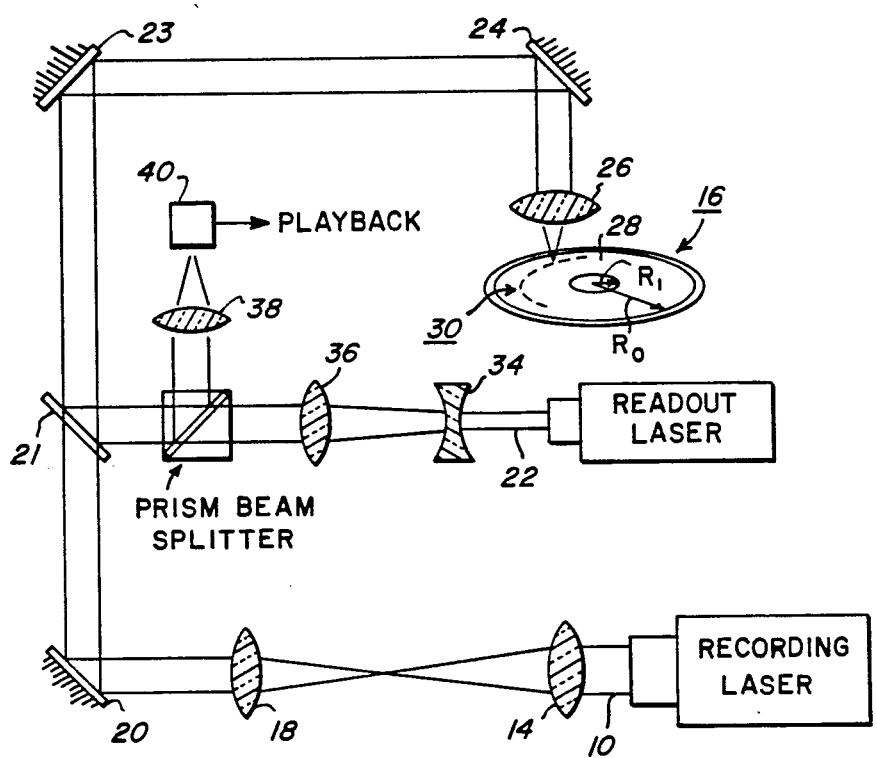
FIG. 1 is a description of a schematic recording and readback apparatus for using the recording elements of the invention.
Figure 2:
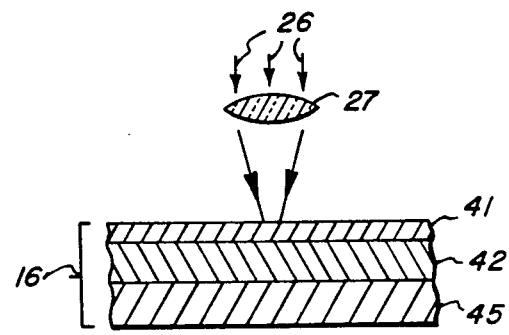
FIG. 2 is a schematic cross section of an optical recording element of this invention.

FIG. 1 shows a schematic of an apparatus for recording information on an optical recording element 16 of the invention and for playing back the recorded information therefrom. Referring to FIG. 2, recording element 16 comprises an overcoat layer 41, amorphous thin film optical recording layer 52 on substrate 45. In response to a drive signal, the intensity of a diode recording beam is modulated in accordance with information to be recorded on thin film 42. The modulated laser beam is collected by a lens 14 and collimated by a lens 18 and is directed by means of mirror elements 20, 23 and 24 to a lens 26 which focuses the modulated laser beam to a recording spot 28 on the film 42 as shown in FIG. 1.

During recording, the element 16 is spun at a constant rate, e.g. 1800 rotations per minute (rpm). As a result, a track of information 30 is recorded on the optical recording layer in the form of selected crystallized areas. As recording continues. The recording spot 28 is caused (by means not shown) to scan radially inward across the element 16, thereby causing information to be recorded along a spiral or concentric track that extends from an outer radius $R_o$ to an inner radius $R_i$. The sizes and spacings of the recorded information marks vary in accordance with the information content of the recording laser drive signal, as well as with radial position on the element 16.

During the readback process, the new information bearing element 16 is spun at the same rate as it was spun during the recording process. A laser beam 22 from a readout laser is expanded in diameter by means of lenses 34 and 36. The optical path of the readout laser beam is folded by a beam splitter 21 and mirrors 23 and 24 so that the readout laser beam is focused to a playback spot on the element 16 by the high numerical aperture lens 26. The element 16 is assumed to be of the reflective type so that the radiation forming the playback spot is reflected back through the high numerical aperture lens 26 after interacting with the information marks recorded on the optical element 16. A lens 38 directs reflected laser radiation which has been diverted by the prism beamsplitter onto a detector 40 which produces an electrical playback signal in response to temporal variations (contrast) in the irradiance of the reflected laser radiation falling on the detector.

The amorphous thin film optical recording layers of this invention are written upon with a coherent beam of electromagnetic radiation of sufficient energy to convert selected portions of the amorphous film 42 to a crystalline state. In the present invention the amorphous thin film optical recording layers are of sufficient sensitivity that laser powers of about 2 to 10 mW at laser pulsewidth of 40 to 100 nanoseconds provides sufficient energy to make the conversion.

Recordings on the amorphous this film were made with a static pit tester.

The static pit tester provides automated facilities in which a microcomputer controls the sample position, the laser power and the laser pulse width. Each recording layer is exposed with a 830 nanometer laser diode in the static pit tester to produce a matrix of spots in which the laser power is varied from 4 to 12 mW and the pulse width varied from 40 to 30,000 nanoseconds. The suitability of the recording layer for optical recording is determined by measuring the change in reflection between the exposed and unexposed areas of the sample, i.e. between the crystalline and amorphous states.

This reflection change is expressed as recording contrast, CT, by the following definition:

$$CT = \frac{R_c - R_\alpha}{R_c + R_\alpha} \times 100\%$$

where $R_c$ and $R_\alpha$ are the reflectances of the crystalline and the amorphous states, respectively. A minimum contrast of 5 percent must be achieved for the films to be considered useful as optical recording layers.

The thin amorphous film recording layers can be prepared by conventional thin film deposition techniques such as evaporation, RF (radio frequency) and DC (direct current) sputtering from an alloy target, and RF and DC co-sputtering from targets of the individual elements. Enhancement of sputtering processes by applying magnetic fields (magnetron sputtering) can also be used. The thickness of the films can be from a few tens to a few hundreds nanometers depending on compromises among factors such as contrast, sensitivity, production rate, material cost, ease of control, data rate, etc.

Supports which can be used include plastic films, such as polyethylene terephthalate, polymethyl methacrylate, and polycarbonate, a glass plate, paper and metallic plates.

The practice of the invention is further described in the following examples.

EXAMPLE 1

Two amorphous thin film optical recording layers of this invention were prepared by a sputtering process. A target composed of mixed Sb and Al powders was pre-sputtered in an 8 mtorr Ar atmosphere for one hour. The pre-sputtering step was designed to achieve a steady state deposition condition.

Thin films of about 80 nm in thickness were then prepared by sputtering the pre-sputtered mix for 4 minutes. The sputtered mix was deposited as a thin film on a glass support. The atomic fraction of each component in the prepared film was determined by inductively coupled plasma atomic emission spectrometry (ICP). It will be understood that some of the components (e.g. Al) may be partially oxidized.

FIG. 3 shows the amorphous to crystalline temperature of thin films of antimony-aluminum comprising (a) 10 atom percent aluminum (curve 1) and (b) 13 atom percent aluminum (curve 2). The transition temperatures were for film (a) 167° C. and for film (b) 187° C. The heating rate was 25 milli-Kelvin per second. These high transition temperatures show that the amorphous state of the films are very stable. This is an important keeping property. Spontaneous transition from amorphous to crystalline would be detrimental to optical recording layers in that the reflectance difference between the crystalline areas and amorphous areas would be lost.

FIG. 3 also shows the excellent contrast achieved with the thin film antimony-aluminum layers of the invention.

Another sample of the thin antimony-aluminum film comprising 13 atom percent of aluminum was written upon using the static pit tester described herein before. The writing was in the form of crystallized marks on the films. The film ($Sb_{87}Al_{13}$) with the crystallized written spots was placed in a chamber at 70° C. and 30 percent relative humidity for an accelerated stability test. After 15 days, the film was examined. We did not observe any phase change or corrosion on the unwritten area or the written spots. The film did not have any overcoat as a protective layer against corrosion. This test shows that the films of the invention bearing written spots are thermally and environmentally stable.

Figure 4:
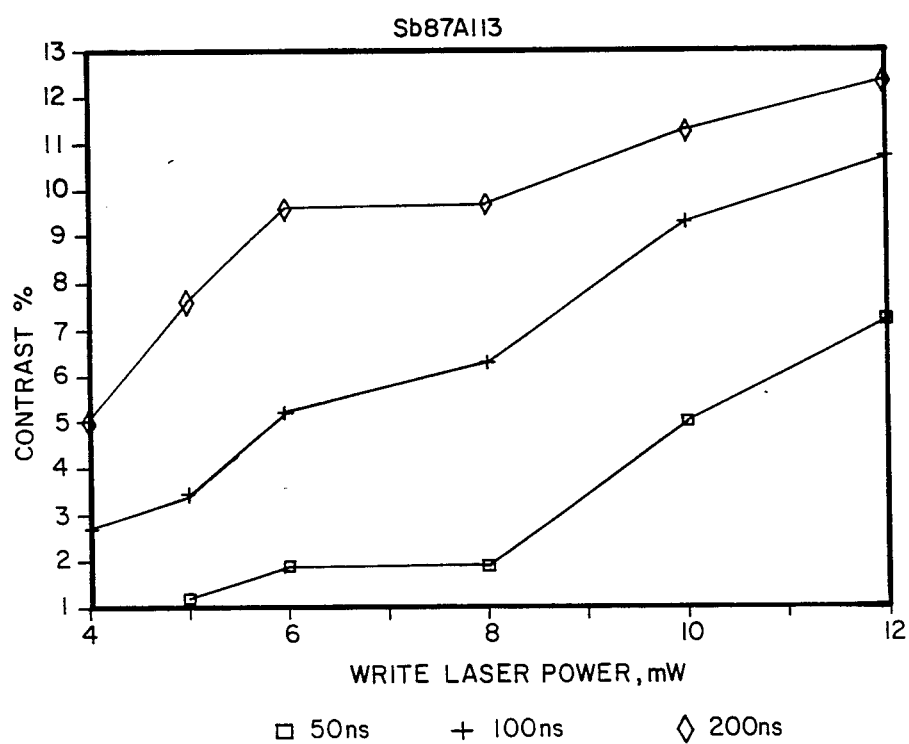

Another film sample comprising 13 atom percent aluminum was subjected to performance tests on the static pit tester. A pulsed semiconductor laser beam with a wavelength of 830 nm was used for writing. The writing sensitivity and contrast at various powers and pulse widths are shown in FIG. 4. The percent contrast between the initial reflectance of the amorphous state and the final reflectance of the crystallized state is clearly measurable and can thus be read by state of the art laser read systems. This data also shows (a) that the thin films can be written upon using practical laser powers and writing speeds and (b) the reflectivity of the crystalline state is higher than the amorphous state.

EXAMPLE 2

A number of amorphous Sb-Al thin films with a range of compositions were prepared according to the method in Example 1. Some representative compositions are $Sb_{93}Al_7$ and $Sb_{80}Al_{20}$. The first film can be written upon at a laser pulse length of 50 ns and power of 6 mW. The second film can be written upon at a laser pulse length of 1 μs and power of 6 mW.

EXAMPLE 3

Thin films of about 100 nm in thickness were then prepared by sputtering for 4 minutes as in Example 1. FIG. 5 shows the amorphous to crystalline temperature and reflectance of two different thin film is of the invention.

The amorphous to crystalline transition temperature, compositions and curve number are set out below:

| FIG. | Curve No. | Temperature °C. | Composition |
| --- | --- | --- | --- |
| 5 | 1 | 156 | $Sb_{82}Sn_8Al_{10}$ |
| 5 | 2 | 142 | $Sb_{65}Sn_{29}Al_6$ |

Comparing to FIG. 3, note that the contrast increases with increasing Sn content in the films. The reflectance of the crystalline areas was consistently greater than the amorphous areas.

Another thin film sample $Sb_{65}Sn_{29}Al_6$ was written upon using the static pit tester described herein before. The writing was in the form of crystallized marks on the films. The film with the crystallized written spots was placed in a chamber at 70° C. and 30 percent relative humidity for an accelerated stability test. After 14 days, the film was examined. We did not observe any phase change or corrosion on the unwritten film or the written spots. The film did not have any overcoat as a protective layer against corrosion. This test shows that the films of the invention bearing written spots are both thermally and environmentally stable.

Figure 6:
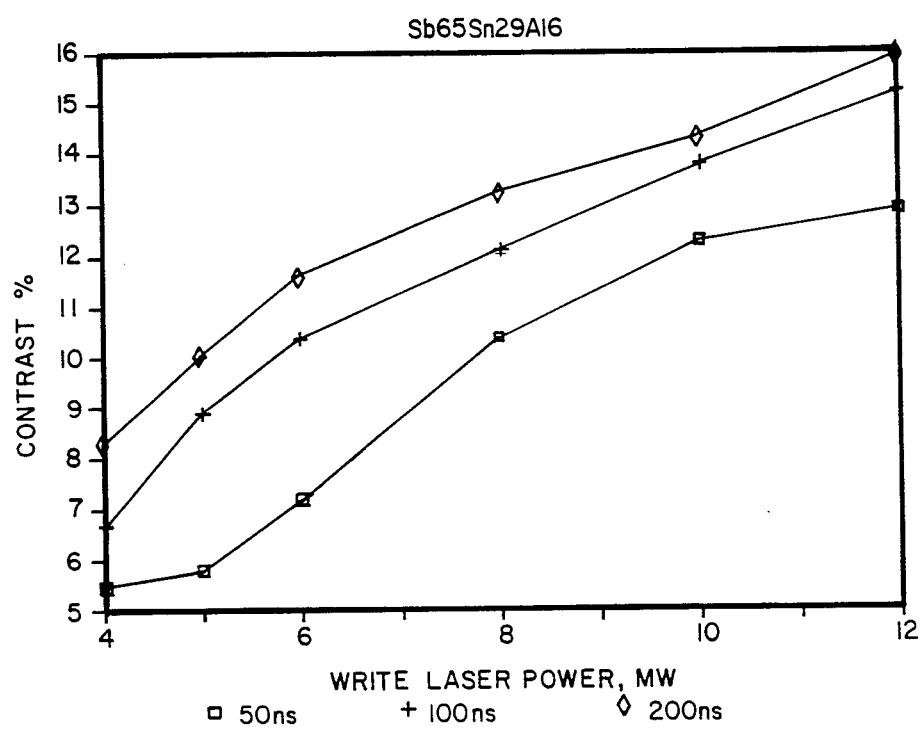
Figure 7:
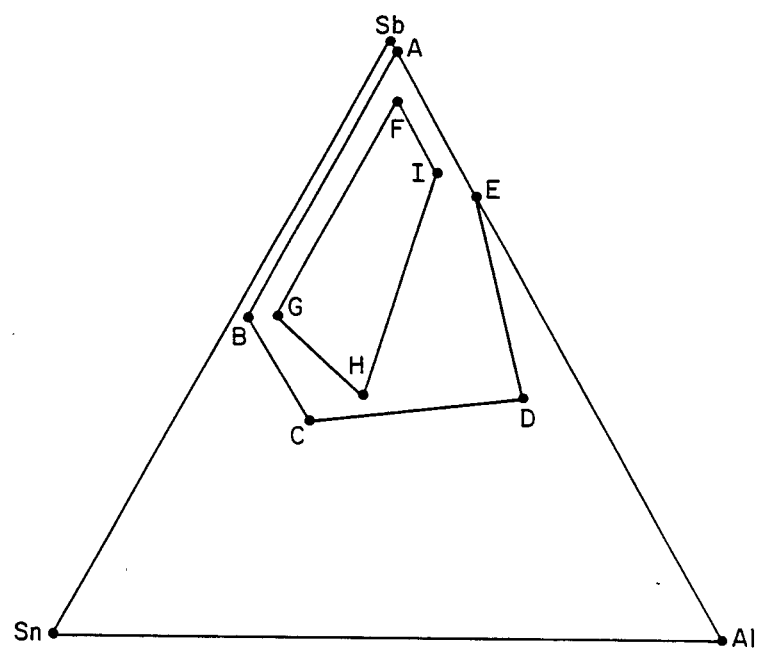
FIG. 7 is a ternary composition diagram showing a polygon within which useful alloy mixtures in the present invention are found.

Another film sample $Sb_{65}Sn_{29}Al_6$ was subjected to performance tests on the static pit tester. A pulsed semiconductor laser beam with a wavelength of 830 nm was used for writing. The writing sensitivity and contrast at various powers and pulse widths are shown in FIG. 6. The percent contrast between the initial reflectance of the amorphous state and the final reflectance of the crystallized state is clearly measurable and can thus be read by state of the art laser read systems. This data also shows that the thin films can be written upon using practical laser powers and writing speeds.

EXAMPLE 4

A number of amorphous thin films with a range of compositions were prepared according to the method in Example 1. Some of the representative compositions were $Sb_{85}Sn_9Al_6$, $Sb_{75}Sn_7Al_{18}$, $Sb_{53}Sn_{30}Al_{17}$, $Sb_{74}Sn_{19}Al_7$, $Sb_{65}Sn_{28}Al_7$ and $Sb_{63}Sn_{32}Al_5$. These films can be written upon at a films can be written upon at a laser pulse length of 50 ns and power of 6 mW.

EXAMPLE 5

Several homogeneous Sb-Sn-Al alloy sputtering targets with various compositions were prepared by hot-pressing. The thin films were prepared by the sputtering process. Some representative compositions are $Sb_{70}Sn_{20}Al_{10}$ and $Sb_{59}Sn_{33}Al_8$. These films were amorphous and can be crystallized at a laser pulse length of 50 ns and power of 6 mW.

The invention has been described in detail with particular reference to preferred embodiments thereof, but it will be understood that variations and modifications can be effected within the spirit and scope of the invention.

We claim:
1. A method of recording information, comprising the steps of:
  (a) providing a recording element comprising a write-once amorphous thin-film optical recording layer of an alloy having a composition within a polygon in a ternary composition diagram of antimony, aluminum, and tin; wherein
    (i) the composition diagram is

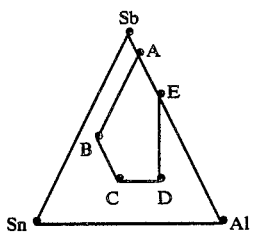

(ii) the polygon has the following vertices and corresponding coordinates in atom percent:

| Vertices | Coordinates | | |
|---|---|---|---|
|  | Sb | Sn | Al |
| A | 98 | 0 | 2 |
| B | 54 | 44 | 2 |
| C | 36 | 44 | 20 |
| D | 40 | 10 | 50 |
| E | 74 | 0 | 26 |

; and (b) focusing an information modulated laser beam on the recording layer to form a pattern of crystalline and amorphous areas in the layer.

2. The method of claim 1 wherein the alloy has a composition within the polygon in the ternary composition-diagram

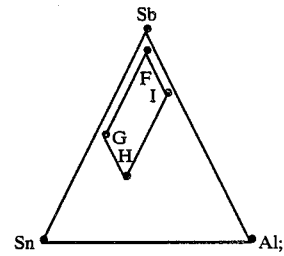

said composition being within the following vertices and corresponding coordinates:

| Vertices | Coordinates | | |
|---|---|---|---|
|  | Sb | Sn | Al |
| B | 90 | 4 | 6 |
| C | 54 | 40 | 6 |
| G | 40 | 34 | 26 |
| H | 78 | 4 | 18 |

3. The method of claim 1 wherein the alloy comprises $Sb_{70}Sn_{20}Al_{10}$ or $Sb_{59}Sn_{33}Al_8$.

* * * * *